United States Patent [19]
Verner

[11] 3,717,741
[45] Feb. 20, 1973

[54] SHORT CIRCUIT PROTECTION SYSTEM FOR ELECTRICAL DISCHARGE MACHINING APPARATUS

[75] Inventor: Dalton R. Verner, Orchard Lake, Mich.

[73] Assignee: Elox Inc., Davidson, N.C.

[22] Filed: March 10, 1971

[21] Appl. No.: 122,838

[52] U.S. Cl............219/69 C, 219/69 S, 219/69 P, 315/225
[51] Int. Cl. ................................................B23p 1/08
[58] Field of Search.............307/24, 29, 31, 35, 82; 315/224, 225, 332; 219/69 S, 69 C, 69 P, 69 R

[56] References Cited

UNITED STATES PATENTS

| | | | |
|---|---|---|---|
| 3,539,753 | 11/1970 | Ullman et al. | 219/69 C |
| 3,257,580 | 6/1966 | Webb | 219/69 S |
| 3,542,989 | 11/1970 | Sennowitz | 219/69 C |
| 3,549,977 | 12/1970 | Watkins | 307/82 |
| 3,538,405 | 11/1970 | Borden et al. | 307/82 X |
| 3,600,655 | 8/1971 | Karlin et al. | 321/27 R |

FOREIGN PATENTS OR APPLICATIONS

| | | | |
|---|---|---|---|
| 414,034 | 12/1966 | Switzerland | 219/69 R |
| 432,677 | 9/1967 | Switzerland | 219/69 R |
| 1,047,908 | 11/1966 | Great Britain | 219/69 R |

*Primary Examiner*—William H. Beha, Jr.
*Attorney*—Hauke, Gifford & Patalidis

[57] ABSTRACT

A protective system is provided for an electrical discharge machining apparatus of the multiple type in which there are a single pulse generator and a plurality of drive and output stages, each associated with a different machining gap. A separate cutoff stage is keyed into operation in phased relationship with the machining power pulses to each gap and control of machining power pulses is exercised through switching of a flip-flop stage operatively connected in each drive stage.

4 Claims, 2 Drawing Figures

INVENTOR
DALTON R. VERNER

INVENTOR
DALTON R. VERNER

BY Hauke, Gifford & Patalidis
ATTORNEYS

SHORT CIRCUIT PROTECTION SYSTEM FOR ELECTRICAL DISCHARGE MACHINING APPARATUS

BACKGROUND OF THE INVENTION

The field to which my invention relates is that known generally as electrical discharge machining, hereinafter sometimes referred to as "EDM". In this process, material is removed from one or more electrically conductive workpieces by electrical gap discharges which are caused to occur between a tool electrode and the workpiece. a servo feed system for the electrode or workpiece is used to provide relative movement and thus maintain an optimum gap spacing between the electrode and workpiece as the material is removed. A dielectric coolant liquid is circulated and recirculated, usually under pressure, through the gap during machining operation. For most reliable and dependable results, a power supply circuit of the independent pulse generator type, such as a multivibrator or oscillator, is utilized to provide machining power pulses to precisely control their frequency and on-off time characteristics. The cutting current, that is the current magnitude of machining power pulses passed to the gap, may be controlled separately or jointly by pulse on-time control and through selective adjustment of series resistance.

The present invention is particularly applicable to an electrical discharge machining setup in which a plurality of electrodes are used to machine simultaneously a plurality of different workpieces, or alternately a number of holes in the same workpiece. This type of EDM operation is particularly suitable for production machining operation. It permits the use of a single pulse generator to operate the plural drive and output stages normally associated with each of the different gaps. During the continued machining operation, one or more of the gaps may become bridged by workpiece or electrode particles to cause a condition commonly known as "gap short circuit condition". This condition is accompanied by excessive localized heat which tends to damage both electrode and workpiece unless a timely corrective action is taken. Corrective action is provided by a variety of systems which have been devised to provide fast-acting servo withdrawal or, alternately or concomitantly with that withdrawal, interruption of machining current to the gap. By my system, I have provided a gap short circuit protection system in which a cutoff stage is provided for each separate gap. The cutoff stage operates on its own associated drive stage to interrupt cutting current from any one gap at which short circuit condition may occur. This permits continuation of cutting on the other machining gaps so that machining operation, as it is provided by the common pulse generator or multivibrator, is continuous except for in gaps experiencing cutting problems.

BRIEF DESCRIPTION OF THE DRAWINGS

The following is a brief description of the drawings in which like numerals and letters are used to refer to like elements where they occur throughout the several views.

DESCRIPTION

Figure 1:
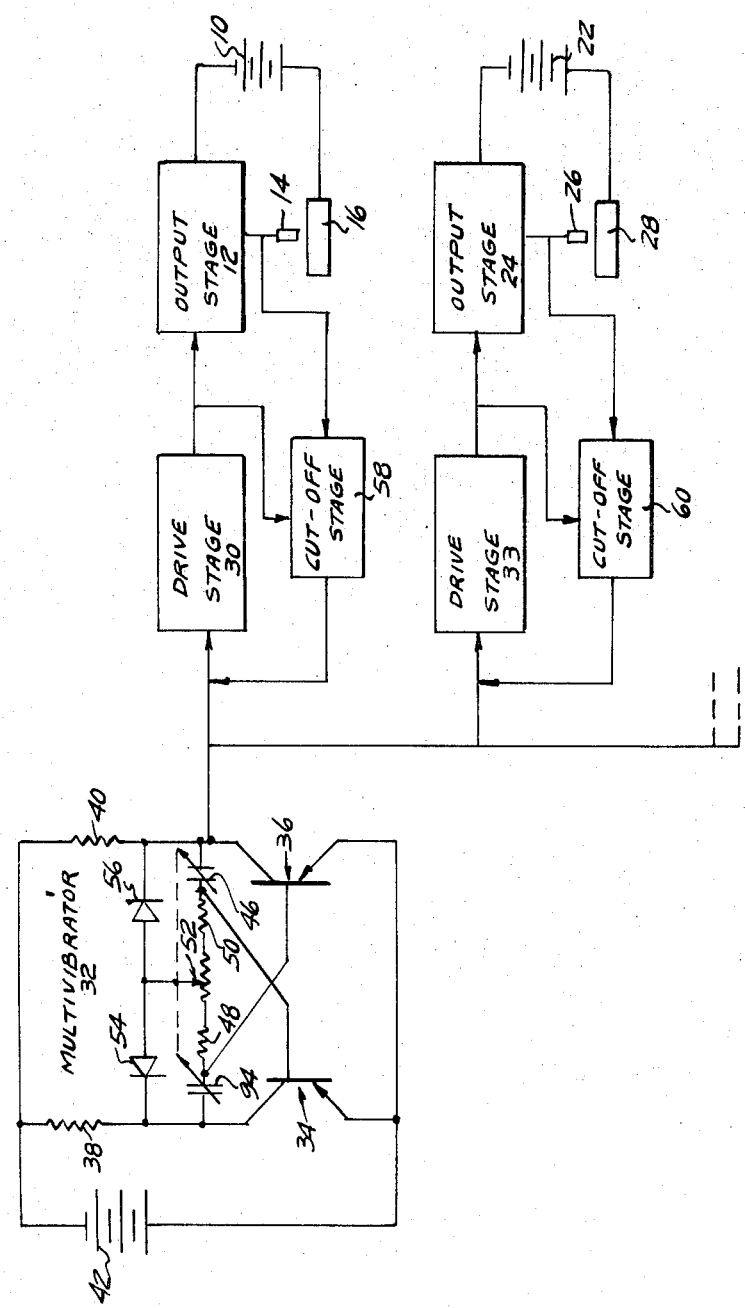
FIG. 1 is a combined schematic and block diagrammatic showing of an electrical discharge machining power supply adapted for use with multiple machining gaps.

Referring now to FIG. 1 of the drawings, the EDM system is shown to include multiple machining gaps. A main machining power source 10 for the upper machining gap is shown connected in series with an output transistor stage 12 and in series with that machining gap comprising a tool electrode 14 and a workpiece 16. A second machining gap is shown at the lower portion of the drawing, which gap similarly includes a main machining power source 22 and an output stage 24 connected with that machining gap comprising a tool electrode 26 and a workpiece 28. The upper machining gap output stage receives triggering pulses from the output from a drive stage 30, which in turn receives its drive signal from a multivibrator 32. The lower machining gap output stage 24 receives its triggering signals from a separate drive stage 33, which similarly receives an output from the multivibrator 32. The multivibrator 32 is used to provide the pulse output to operate the several output stages. It will be noted that while I have illustrated two machining gaps, each of which is associated with its own output and drive stages, it is possible to operate a much greater number of gaps from a single multivibrator 32 and four to ten or even additional gaps may be driven from one multivibrator output. Included in the multivibrator 32 are a pair of PMP transistors 34 and 36, which transistors are biased and coupled for alternate operation in the astable multivibrator mode. The transistors 34 and 36 are connected respectively to a pair of load resistors 38 and 40 to the negative terminal of a DC source 42. A pair of variable capacitors 44 and 46 are adjustable by ganged control and function to cross-couple the collectors of the transistors 34, 36 each to the opposing transistor base. A pair of signal limiting resistors 48 and 50, and potentiometer 52, are included in the multivibrator circuit with the on-off time or duty factor of the multivibrator output controlled by the setting of the potentiometer 52. A pair of protective diodes 54 and 56 are connected as shown in circuit with the movable contact of the potentiometer 52. The frequency of the multivibrator 32 operation, and hence the frequency of the machining power pulses furnished to the machining gap or gaps may be selectively controlled by changing the value of the capacitors 44, 46 by a ganged switch arrangement such as is indicated by the dash line. The pulse output from the multivibrator 32 is suitably amplified and resquared through the drive stages 30, 33 already referred to above. The cutoff stages shown in block form are cutoff stage 58 associated the the upper machining gap and cutoff stage 60 associated with the lower machining gap.

While the present invention employs transistors as electronic switches, the invention is not so limited, but with proper redesign of the circuit by one skilled in the art any electronic switch may be substituted. By "electronic switch" I mean any electronic control device having three or more electrodes, comprising at least two power electrodes acting to control current flow in the power circuit, the conductivity of the power circuit being controlled by a control electrode within the switch, whereby the conductivity of the power circuit is regulated statically or electrically without movement of any mechanical elements within the switch. Included within this definition, by way of illustration but not by way of limitation, are electronic tubes, tegrations, transistors, silicon controlled rectifiers and other like devices.

Figure 2:
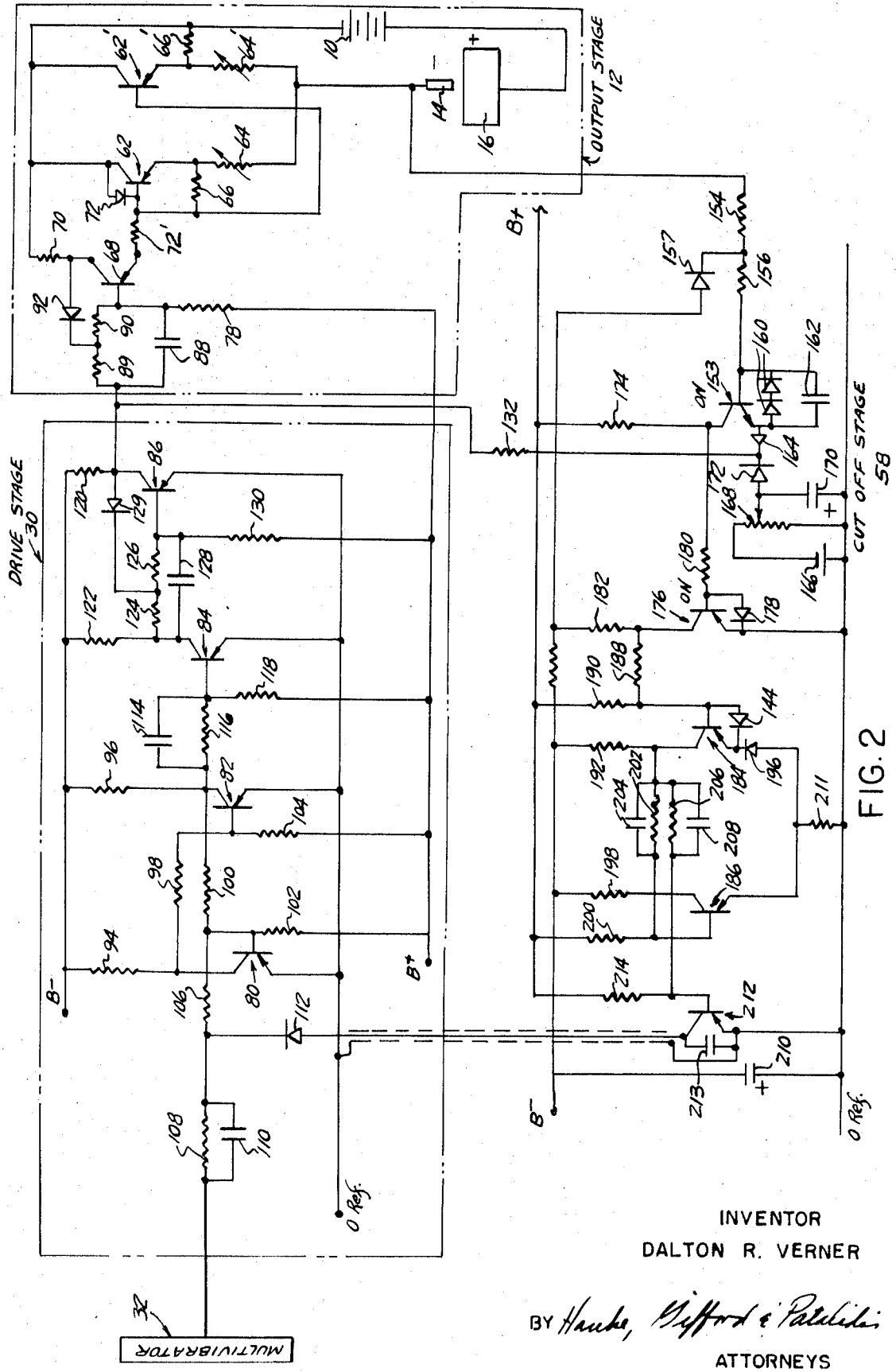
FIG. 2 is a partially diagrammatic schematic drawing illustrating the detail of the drive stage, output stage and cutoff stage already shown in block form in FIG. 1.

FIG. 2 shows the manner in which the output from the multivibrator 32 is used to control machining power pulse output across one of a plurality of gaps. The detail of the drive, output and cutoff stage circuits for the upper gap of FIG. 1 is shown. Associated with the gap, comprising the electrode 14 and the workpiece 16, is the machining power source 10 having connected with it a plurality of parallel-connected electronic switches embodied as a pair of PNP transistors 62 and 62'. Connected in series with the emitter of each of these transistors is a cutting current limiting resistor 64, 64'. Transistors 62, 62' further have connected across their respective base emitter junction resistors 66, 66', which resistors provide protection against excess turn-off voltage. The drive signal is furnished for output transistors 62, 62' according to the conduction of a transistor 68, which has its collector load resistor 70 connected to the negative terminal of DC source 10. A signal resistor 72' is connected between the emitter of the transistor 68 and the bases of transistors 62, 62'. Transistor 62 further has a protective diode 72 coupled across its base collector junction. With respect to the transistor 68, a bias is furnished to its base through a resistor 78, which is coupled to a B+ source as indicated.

The drive stage 30 is connected between the output of multivibrator 32 and output stage 12. Included in the drive stage 30 is a flip-flop, including transistors 80, 82. Subsequent transistor stages include transistors 84 and 86. It will be noted that transistor 86 has its collector coupled to the base of the transistor 68 through a signal network including the capacitor 88 with resistors 89 and 90. A protective diode 92 for transistor 68 is connected as shown. The flip-flop, comprising transistors 80, 82, further includes a collector load resistor 94 for the transistor 80 and a collector load resistor 96 for the transistor 82. A resistor 98 is connected between the collector of the transistor 80 and the base of the transistor 82. A resistor 100 is connected between the base of the transistor 80 and the collector of the transistor 82. With respect to the flip-flop, resistor 98 is of a magnitude tending to hold transistor 82 in the non-conductive condition in the absence of an input signal to the flip-flop from the cutoff stage 58. A bias is further provided to the base of the transistor 80 through a resistor 102 and to the base of the transistor 82 through a resistor 104. A signal resistor 106 is coupled between the parallel network, including resistor 108 and capacitor 110, and the base of the transistor 80. The resistor 106 further has its left-hand terminal connected to a diode 112 and a coaxial lead which provides the output signal from the cutoff stage 58.

A signal network is connected between the collector of the transistor 82 and the base of the transistor 84, which network includes a parallel-connected capacitor 114 and resistor 116. Bias is provided to the base of the transistor 84 through a resistor 118. The final stage of the drive stage 30 incorporates the transistor 86, which has connected to its collector a load resistor 120. The transistor 84 similarly has a collector load resistor 122. A signal limiting network connected between the collector of the transistor 84 and the base of the transistor 86 includes a pair of resistors 124, 126 and a shunt capacitor 128. A protective diode 129 is coupled in the manner shown. A suitable bias is further provided to the base of the transistor 86 through a resistor 130.

With respect to the cutoff stage 58 shown at the lower portion of FIG. 2, a keying signal lead is connected through a limiting resistor 132 to the output of the drive stage 30. Included in the right-hand end of the cutoff stage 58 is a transistor 153, which transistor has its base in series with resistors 154 and 156. The resistor 156 has its right-hand terminal connected through a series diode 157 to the negative voltage provided by a B− source. The transistor 153 further has its base emitter junction shunted by a pair of series diodes 160. A capacitor 162 is connected across diodes 160. The keying signal is shown in the manner it is passed through a diode 164 to the emitter of the transistor 153. A reference voltage source is provided, which reference voltage includes a DC supply 166, a potentiometer 168 and a capacitor 170 connected between the positive terminal of DC supply 166 and the movable contact of the potentiometer 168. A diode 172, phased as shown, is connected between the keying signal input and the reference voltage source. Coupled in series with the collector of the transistor 153 is a load resistor 174. A transistor stage next following includes a PNP transistor 176 which has a protective diode 178 connected across its base emitter junction and a current limiting resistor 180 connected in series with its base. A collector load resistor 182 is further connected between the transistor 176 collector and the negative terminal of a suitable bias source.

The next stage in the cutoff circuit includes a pair of alternately conductive transistors 184 and 186. The transistor 184 has its base connected to the output of the transistor 176 through a signal limiting resistor 188 with a bias furnished to its base through a resistor 190. The collector of the transistor 184 is connected to a load resistor 192 and it further has a protective diode 144 connected across its base emitter junction. A second diode 196 poled in the manner shown is connected in series with the emitter of the transistor 184. The transistor 186 has connected to its collector a load resistor 198 with a bias resistor 200 connected between its base and a B+ voltage source. The circuit includes a pair of RC networks, including a shunt network with resistor 202 and capacitor 204 and a shunt network including resistor 206 and capacitor 208. This circuit is completed by a resistor 211.

The control output from the cutoff stage 58 is provided from the collector of the final transistor cutoff stage which includes a transistor 212, which transistor has its base connected to the left-hand terminal of the RC shunt network including resistor 206 and capacitor 208. The collector and emitter of the transistor 212 are shunted by a capacitor 213. Responsive to the conduction of transistor 212, an appropriate signal is passed through the coaxial lead shown and through diode 112 to the base of the flip-flop transistor 80.

DESCRIPTION OF OPERATION

The relative phasing of the several transistors in the drive stage 30 and in the output stage 12 is as follows:

In the flip-flop, including transistors 80 and 82, there is an unbalanced feedback through resistor 98 which tends to hold transistor 82 off. During normal machining operation, transistor 80 is triggered on and following transistor stages 84, 68, 62 and 62' are all triggered on in phase with the gap machining power pulses being passed across the gap. The transistor 86 is turned off during machining pulse on-time.

When a gap short circuit condition occurs, the gap voltage sensed at the upper terminal of the tool electrode 14 drops. This provides a control signal to the cutoff stage 58, and, more particularly, turns on the first transistor 153. An adjustable DC reference supply is coupled to the emitter of the transistor 153 which reference includes DC source 166, potentiometer 168 and capacitor 170. A keying signal of a negative polarity is passed through resistor 132 and diode 164 to the emitter of the transistor 153. Turn-on of the transistor 153 is thus enabled only in phase with each machining power pulse passed across the gap. In its conductive stage, the transistor 153 also turns on the next following transistor 176. When the transistor 176 is turned on, the output signal taken from its collector turns the transistor 184 off and the transistor 186 is turned on. During the conduction of the transistor 186, the final transistor of the cutoff stage 58, namely transistor 212, is turned on. The triggering of the transistor 212 into its conducting state switches the flip-flop included in the drive stage 30 to its other stable stage in which the transistor 80 is turned off and transistor 82 is turned on. When transistor 82 is rendered conductive, it interrupts drive signal from the following transistor 84 and there is a turn-off of all of the following stages normally operated in phase with transistor 84 so that the machining power pulses to the gap are completely interrupted responsive to the turn-off of the output switch transistors 62 and 62'.

I have found that the inclusion of the flip-flop within the drive stage makes it possible to interrupt pulses to the gap without having deleterious effect on the operation of the multivibrator 32. This makes possible the operation of a relatively large number of output switches and associated gaps all from the same pulse generator, such as multivibrator 32 as is shown in FIG. 1. The resultant power supply circuit is one which provides secure protection against short circuit damage to any of the individual machining gaps, while normal cutting at the other gaps is continued uninterrupted.

This results in an improved multiple EDM cutoff protection of a type heretofore neither available nor known.

I claim:

1. In an electrical discharge machining apparatus for machining a conductive workpiece by electrical discharges passed from a tool electrode to the workpiece across a dielectric coolant filled gap, a periodically operated output switch and a power supply operatively connected to said gap for providing machining power pulses thereto, a pulse generator for providing triggering pulses, and a drive stage operatively connected between said pulse generator and said output switch for resquaring and amplifying said pulses from said pulse generator wherein the improvement comprises a cut-off stage for interrupting pulses from said drive stage responsive to gap short circuit condition, said drive stage including a bistable flip-flop, including a pair of electronic switches, one of said electronic switches normally conductive in phase with said output switch, said cutoff stage operatively connected between said gap and the other electronic switch of said flip-flop for rendering it conductive and thus effective to hold off pulses to said output switch responsive to said condition, said cutoff stage further being diode coupled to a point between said multivibrator output and said generator output to bleed the output signal from said multivibrator during said condition.

2. The combination as set forth in claim 1 wherein said cutoff means is keyed toward conduction responsive to pulse output from said drive stage to said output switch.

3. The combination as set forth in claim 1 wherein a presettable reference voltage is operatively connected to said cutoff stage for keying it toward conduction in predetermined phase relationship with respect to said output switch.

4. The combination as set forth in claim 1 wherein a plurality of machining gaps are included in said apparatus, wherein a separate drive stage is connected between said pulse generator and each of said gaps and its associated output switch and wherein a separate one of said cutoff stages is operably connected between each of said gaps and its drive stage for providing output switch interruption from said drive stage responsive to gap short circuit condition in its associated machining gap.

* * * * *

UNITED STATES PATENT OFFICE
CERTIFICATE OF CORRECTION

Patent No. 3,717,741                Dated February 20, 1973

Inventor(s) DALTON R. VERNER

It is certified that error appears in the above-identified patent and that said Letters Patent are hereby corrected as shown below:

In the drawings, in Fig. 2, the emitters of transistors 80, 82, 84 and 86 should be directly connected to the positive side of the source through the workpiece 16, also, consistent with the other depictions of diodes a vertical line should appear at the apex of the triangle of diode 164.

Signed and sealed this 13th day of August 1974.

(SEAL)
Attest:

McCOY M. GIBSON, JR.
Attesting Officer

C. MARSHALL DANN
Commissioner of Patents